United States Patent
Ehrlich et al.

(10) Patent No.: US 9,804,784 B2
(45) Date of Patent: *Oct. 31, 2017

(54) LOW-OVERHEAD STORAGE OF A HIBERNATION FILE IN A HYBRID DISK DRIVE

(71) Applicant: KABUSHIKI KAISHA TOSHIBA, Tokyo (JP)

(72) Inventors: Richard M. Ehrlich, Saratoga, CA (US); Eric R. Dunn, Cupertino, CA (US); Fernando Anibal Zayas, Rangiora (NZ); Thorsten Schmidt, Livermore, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,739

(22) Filed: Jul. 7, 2016

(65) Prior Publication Data

US 2016/0320970 A1 Nov. 3, 2016

Related U.S. Application Data

(63) Continuation of application No. 13/707,505, filed on Dec. 6, 2012, now Pat. No. 9,417,820.

(51) Int. Cl.
*G06F 12/00* (2006.01)
*G06F 13/00* (2006.01)
(Continued)

(52) U.S. Cl.
CPC .............. *G06F 3/061* (2013.01); *G06F 3/068* (2013.01); *G06F 3/0614* (2013.01);
(Continued)

(58) Field of Classification Search
CPC ...... G06F 3/068; G06F 3/0614; G06F 3/0646; G06F 3/0685; G06F 9/4418;
(Continued)

(56) References Cited

U.S. PATENT DOCUMENTS

| 7,620,784 | B2 | 11/2009 | Panabaker | |
|---|---|---|---|---|
| 9,417,820 | B2* | 8/2016 | Ehrlich et al. | G06F 3/068 |
| | | | | 711/162 |
| 2005/0086551 | A1 | 4/2005 | Wirasinghe et al. | |
| 2007/0276995 | A1 | 11/2007 | Caulkins et al. | |
| 2008/0222353 | A1 | 9/2008 | Nam et al. | |
| 2008/0288714 | A1 | 11/2008 | Salomon et al. | |
| 2009/0172280 | A1 | 7/2009 | Trika et al. | |
| 2009/0193182 | A1 | 7/2009 | Nitta | |
| 2009/0327608 | A1 | 12/2009 | Eschmann et al. | |
| 2011/0145489 | A1* | 6/2011 | Yu | G06F 3/0613 |
| | | | | 711/103 |
| 2011/0231595 | A1* | 9/2011 | Wakrat | G06F 1/3203 |
| | | | | 711/103 |
| 2012/0144097 | A1 | 6/2012 | Hashimoto | |
| 2012/0179860 | A1 | 7/2012 | Falanga et al. | |

(Continued)

FOREIGN PATENT DOCUMENTS

| JP | 07-130115 | 5/1995 |
|---|---|---|
| JP | 2004164185 A | 6/2004 |

(Continued)

OTHER PUBLICATIONS

JP OA dated Jul. 13, 2016 for Application No. 2013-153054.

*Primary Examiner* — Yaima Rigol
*Assistant Examiner* — Shane Woolwine
(74) *Attorney, Agent, or Firm* — Patterson & Sheridan, LLP

(57) ABSTRACT

A hybrid drive and associated methods provide low-overhead storage of a hibernation file in the hybrid hard disk drive. During operation, the hybrid drive allocates a portion of solid-state memory in the drive that is large enough to accommodate a hibernation file associated with a host device of the hybrid drive. In addition to the erased memory blocks that are normally present during operation of the hybrid drive, the portion of solid-state memory allocated for accommodating the hibernation file may include over-provisioned memory blocks, blocks used to store a previous hibernation file that has been trimmed, and/or non-dirty blocks.

18 Claims, 5 Drawing Sheets

(51) Int. Cl.
*G06F 13/28* (2006.01)
*G06F 3/06* (2006.01)
*G06F 12/02* (2006.01)
*G06F 9/44* (2006.01)

(52) U.S. Cl.
CPC .......... *G06F 3/0659* (2013.01); *G06F 3/0679* (2013.01); *G06F 9/4418* (2013.01); *G06F 12/0246* (2013.01); *G06F 3/0646* (2013.01); *G06F 2212/217* (2013.01); *G06F 2212/7202* (2013.01)

(58) Field of Classification Search
CPC ....... G06F 2212/217; G06F 2212/7202; G06F 12/0246; G06F 17/30221; G06F 3/061; G06F 3/0679; G06F 3/0659
USPC ... 711/4, 100, 111, 112, 113, 160, 161, 162, 711/102, 103; 713/323; 714/E11.14
See application file for complete search history.

(56) References Cited

U.S. PATENT DOCUMENTS

| | | |
|---|---|---|
| 2012/0226927 A1 | 9/2012 | Kagan et al. |
| 2013/0067137 A1 | 3/2013 | Molloy |
| 2014/0047427 A1* | 2/2014 | Evans ................. G06F 9/45529 717/168 |

FOREIGN PATENT DOCUMENTS

| | | |
|---|---|---|
| JP | 2009181314 A | 8/2009 |
| JP | 2012123499 A | 6/2012 |
| JP | 2012529692 A | 11/2012 |

* cited by examiner

LOW-OVERHEAD STORAGE OF A HIBERNATION FILE IN A HYBRID DISK DRIVE

CROSS-REFERENCE TO RELATED APPLICATION

This application is a continuation of U.S. patent application Ser. No. 13/707,505, filed on Dec. 6, 2012, the entire contents of which are incorporated herein by reference

BACKGROUND

Field of the Invention

Embodiments described herein relate generally to data storage units, systems and methods for storing a hibernation file in a hybrid disk drive.

Description of the Related Art

Hybrid hard disk drives (HDDs) include one or more rotating magnetic disks combined with non-volatile solid-state (e.g., flash) memory. Generally, a hybrid HDD has both the capacity of a conventional HDD and the ability to access data as quickly as a solid-state drive, and for this reason hybrid drives are expected to be commonly used in laptop computers. Some hybrid HDDs achieve the high performance of a solid-state drive by treating the non-volatile solid-state memory as a very large cache for the disk portion of the hybrid HDD. Specifically, all write data is typically accepted directly from the host into the flash memory portion of the hybrid HDD and, similarly, data read from the disk is written into flash as well. In this way, the flash memory can speed up write operations, since the relatively slower write-to-rotating disk operations do not affect how quickly data are accepted from the host unless the flash memory is full. Furthermore, the flash memory can speed up read operations by caching data that are more likely to be requested again by the host, i.e., the data used by the host most recently or most frequently. This minimizes the occurrence of relatively slow read-from-rotating-disk operations.

One issue common to laptop computers is the need to safely store a hibernation file as quickly as possible. This is because the read/write head and the spinning mechanism of the magnetic disk drive can be damaged when physical disturbances occur while data are written to the disk, such as when a user puts a laptop into the so-called "S4" or "hibernate" mode and then immediately closes and picks up the laptop. Ideally, a hybrid HDD is configured to store hibernation-file data to the flash memory portion of the drive, so that the read/write heads can be parked and the storage disks spun down immediately after hibernation mode is requested. Such a configuration of a hybrid HDD is problematic, however, because hibernation files can be quite large, requiring an undesirably large portion of the flash memory to be reserved, i.e., unused, to enable the storing of a hibernation file at all times during normal operation. So while such a hybrid HDD can be readily implemented, use of the available storage resources in the hybrid HDD would be inefficient and not cost effective.

SUMMARY

One or more embodiments provide systems and methods for low-overhead storage of a hibernation file in a hybrid hard disk drive that includes a storage disk and non-volatile solid-state memory. During operation, the hybrid drive allocates a portion of the solid-state memory large enough to accommodate a hibernation file associated with a host device of the hybrid drive. In addition to the erased memory blocks that are normally present during operation of the hybrid drive, the portion of the solid-state drive allocated for accommodating the hibernation file may include over-provisioned memory blocks, blocks used to store a previous hibernation file that has been trimmed, non-dirty data, and/or obsolete data.

A method of hibernating a device having a volatile memory and connected to a nonvolatile storage unit configured with a solid-state memory and a magnetic memory, according to an embodiment, includes receiving a hibernate command and, upon receiving the hibernate command, storing contents of the volatile memory in first and second portions of the solid-state memory without storing contents of the volatile memory in the magnetic memory. The first portion comprises erased memory blocks and the second portion comprises memory blocks storing at least one of data that are also stored on the magnetic memory, invalid data (which may be trimmed data or obsolete data), and contents of a previous hibernation file associated with the device.

A method of storing data in a device having a volatile memory and connected to a nonvolatile storage unit configured with a solid-state memory and a magnetic memory, according to another embodiment, comprises transmitting a write command that is not associated with hibernating the device to the nonvolatile storage unit and, when a combined data storage capacity of an allocated storage space in the solid-state memory is less than a predetermined threshold, writing data to the magnetic memory. The allocated storage space includes a first portion comprising erased memory blocks and a second portion comprising memory blocks storing at least one of data that are also stored on the magnetic memory, invalid data (which may be trimmed data or obsolete data), and contents of a previous hibernation file associated with the device.

According to another embodiment, a nonvolatile data storage unit comprises a magnetic memory, a solid-state memory, and a storage controller. The storage controller is configured to receive a write command that is not associated with hibernating a host device of the nonvolatile storage unit and, when a combined data storage capacity of an allocated storage space in the solid-state memory is less than a predetermined threshold, writing data to the magnetic memory. The allocated storage space includes a first portion comprising erased memory blocks and a second portion comprising memory blocks storing at least one of data that are also stored on the magnetic memory, invalid data (which may be trimmed data or obsolete data), and contents of a previous hibernation file associated with the device.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
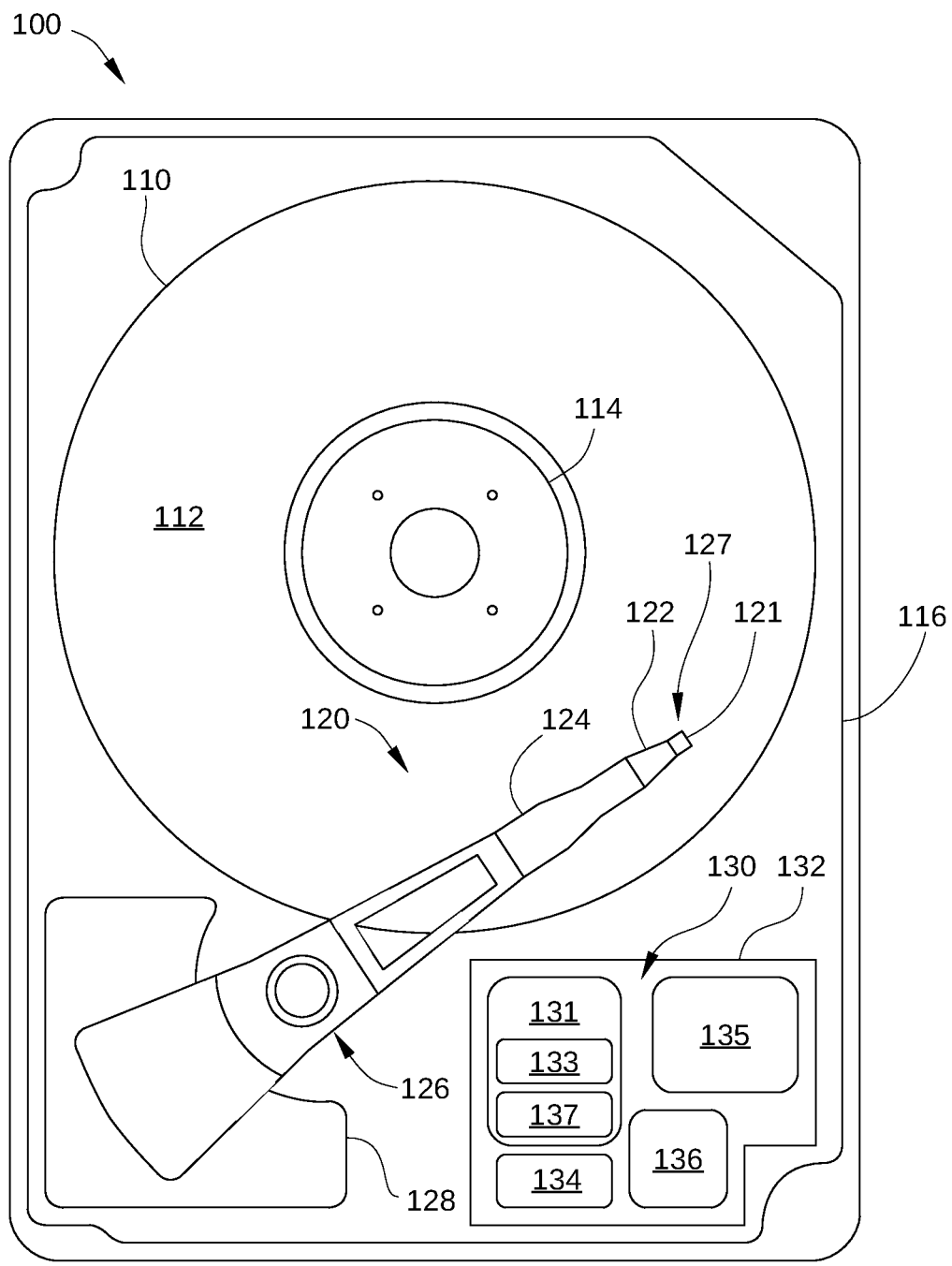
FIG. 1 is a schematic view of an exemplary disk drive, according to an embodiment of the invention.

FIG. 1 is a schematic view of an exemplary disk drive, according to an embodiment of the invention. For clarity, hybrid drive 100 is illustrated without a top cover. Hybrid drive 100 includes at least one storage disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are coupled to electronic circuits 130, which are mounted on a printed circuit board 132. Electronic circuits 130 include a read channel 137, a microprocessor-based controller 133, random-access memory (RAM) 134 (which may be a dynamic RAM and is used as a data buffer), and/or a flash memory device 135 and flash manager device 136. In some embodiments, read channel 137 and microprocessor-based controller 133 are included in a single chip, such as a system-on-chip 131. In some embodiments, hybrid drive 100 may further include a motor-driver chip for driving spindle motor 114 and voice coil motor 128.

For clarity, hybrid drive 100 is illustrated with a single storage disk 110 and a single actuator arm assembly 120. Hybrid drive 100 may also include multiple storage disks and multiple actuator arm assemblies. In addition, each side of storage disk 110 may have an associated read/write head coupled to a flexure arm.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges by read/write head 127 to determine the position of read/write head 127 over a specific data storage track. The servo system determines an appropriate current to drive through the voice coil of voice coil motor 128, and drives said current using a current driver and associated circuitry.

Hybrid drive 100 is configured as a hybrid drive, and in normal operation data can be stored to and retrieved from storage disk 110 and/or flash memory device 135. In a hybrid drive, non-volatile memory, such as flash memory device 135, supplements the spinning storage disk 110 to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device is a non-volatile solid state storage medium, such as a NAND flash chip that can be electrically erased and reprogrammed, and is sized to supplement storage disk 110 in hybrid drive 100 as a non-volatile storage medium. For example, in some embodiments, flash memory device 135 has data storage capacity that is orders of magnitude larger than RAM 134, e.g., gigabytes (GB) vs. megabytes (MB).

Figure 2:
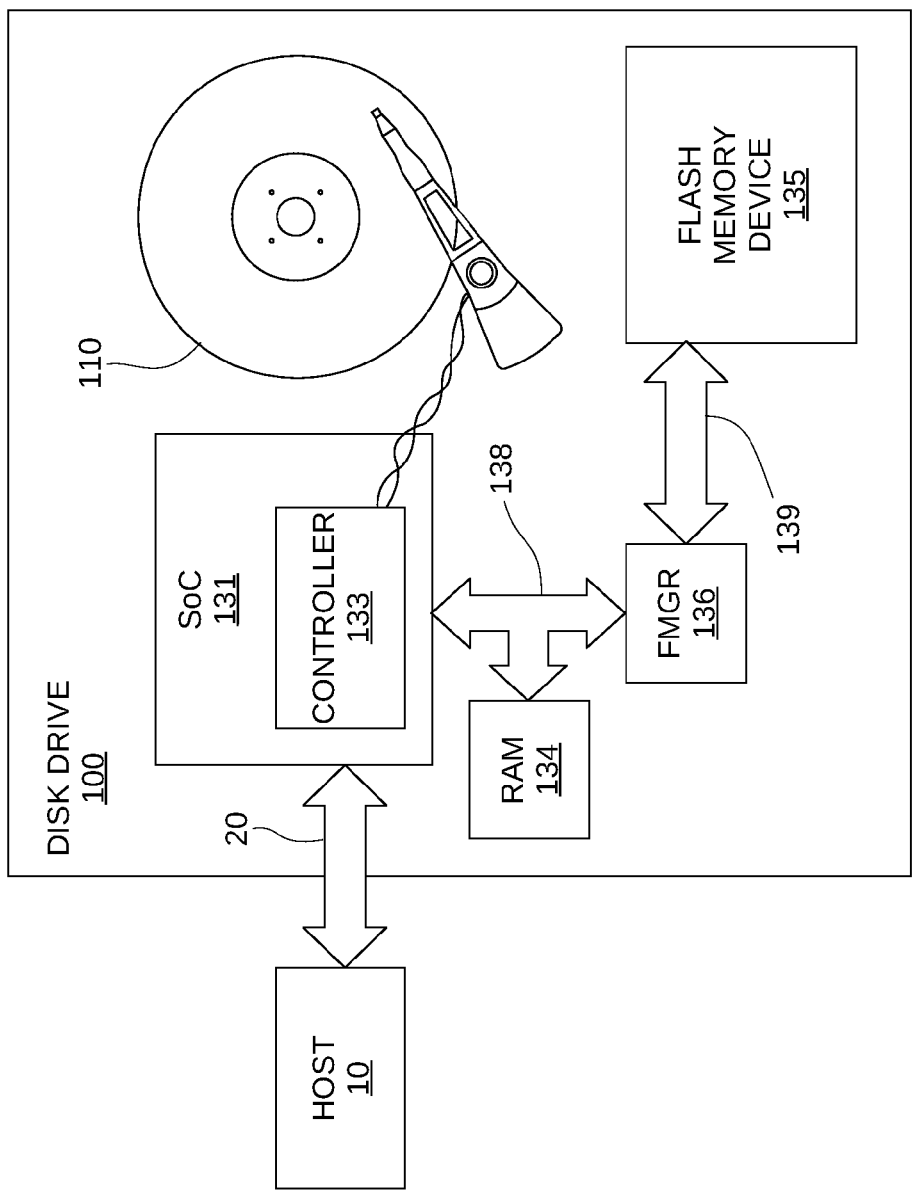
FIG. 2 illustrates an operational diagram of a hybrid drive with elements of electronic circuits shown configured according to an embodiment of the invention.

FIG. 2 illustrates an operational diagram of hybrid drive 100 with elements of electronic circuits 130 shown configured according to an embodiment of the invention. As shown, hybrid drive 100 includes RAM 134, flash memory device 135, a flash manager device 136, system-on-chip 131, and a high-speed data path 138. Hybrid drive 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with high-speed data path 138 and is connected to flash memory device 135 via a NAND interface bus 139. System-on-chip 131 includes microprocessor-based controller 133 and other hardware (including a read channel) for controlling operation of hybrid drive 100, and is connected to RAM 134 and flash manager device 136 via high-speed data path 138. Microprocessor-based controller 133 is a control unit that may include a microcontroller such as an ARM microprocessor, a hybrid drive controller, and any control circuitry within hybrid drive 100. High-speed data path 138 is a high-speed bus known in the art, such as a double data rate (DDR) bus, a DDR2 bus, a DDR3 bus, or the like.

Data transferred to flash memory device 135 may be write data accepted directly from host 10 as part of a write request or as data read from storage disk 110 as part of a read request. When data are transferred to high-density NAND-type devices in flash memory device 135, the data are written to blocks of NAND memory that have been erased previously; if insufficient erased blocks are present in flash memory device 135, additional memory blocks must first be erased before the desired data are transferred to flash memory device 135. These additional memory blocks may be data blocks that are currently storing "dirty" data, which is data that is only stored in flash memory device 135, or "non-dirty" data, which is data that is a copy of corresponding data already stored on storage disk 110, or they may contain obsolete data, which is data for which a newer version has been written to flash memory device 135. Because dirty data must first be "flushed" to storage disk 110 before being "evicted," it is generally desirable to erase non-dirty data blocks rather than dirty data blocks, due to the additional time required; flushing data to storage disk 110 involves storing the data in question to storage disk 110. In situations in which memory blocks to be erased include a mixture of dirty, non-dirty, and/or obsolete data, the well-known process of "garbage collection" may also be performed in flash memory device 135 to provide sufficient memory blocks for storing the desired data being transferred to flash memory device 135. The process of garbage collection, as it pertains to various embodiments of the invention, is described in greater detail below.

To expedite the process of writing data to flash memory device 135, in some embodiments hybrid drive 100 maintains, whenever possible, a predetermined optimal fraction of flash memory device 135 that is erased and available for immediate data writing. For example, in some embodiments, hybrid drive 100 may maintain 20% of the capacity of flash memory device 135 erased and available whenever possible.

Maintaining more than the optimal fraction of flash memory device 135 in an erased state reduces the amount of data cached by flash memory device 135. Having less data cached in flash memory device 135 than the optimal fraction increases the frequency of "cache misses" by a host 10, in which data must be read from data storage disk 110 rather than from the relatively faster flash memory device 135. Cache misses therefore slow the performance of hybrid disk 100 and are preferably avoided.

Maintaining less than the optimal fraction of flash memory device 135 in an erased state can also greatly slow the performance of hybrid drive 100, since flash memory device 135 can be quickly filled and therefore unable to accept new data. When flash memory device 135 is filled, subsequent write commands from the host must then be written to data storage disk 110 directly, which eliminates the speed advantage of hybrid drive 100 over a convention disk drive.

It is noted that in normal operation, flash memory device 135 can frequently have fewer erased and available memory blocks than the predetermined optimal fraction described above. For example, when hybrid drive 100 has received a large number of commands from host 10 that cause data to be written to flash memory device 135 with little or no idle time, most or all of the available erased memory blocks in flash memory device 135 can be filled.

When the portion of flash memory device 135 that is erased and available for receiving data is less than the predetermined optimal fraction, hybrid drive 100 begins evicting data from flash memory device 135. Various eviction schemes are known in the art for selecting what data should be evicted and will not be described herein. Generally, hybrid drive 100, or in some embodiments a flash manager or controller, selects data for eviction in flash memory device 135 that is the least likely to be requested again by host 10, where selection of the data is based on frequency and/or recency of use of the data. Thus, flash memory device 135 includes data that are the most recently and most frequently used data by host 10.

When host 10 is placed in the so-called "S4" or "hibernate" mode by a user, host 10 saves the contents of volatile memory, such as DRAM, to hybrid drive 100 and completely powers down. The data saved prior to hibernation is generally stored in a single file, sometimes referred to as a "hiberfile." Such hibernation data is an amalgam of the different files, settings, and the like currently loaded in the volatile memory of host 10, and allows the current state of host 10 to be retained, even after host 10 is powered off. Generally, the maximum size of such hibernation data is approximately equal to or less than the size of physical memory in host 10 that will generate the hibernation data.

Hibernation data can easily exceed the size of erased memory blocks that are present in flash memory device 135 at the time of the hibernate request, for example when hybrid drive 100 has recently received a large number of write commands from host 10 with little or no idle time to evict data and erase memory blocks. Furthermore, given that hibernation data can be on the order of a few GBs in size, such hibernation data can exceed the storage capacity of erased memory blocks in flash memory device 135, even when flash memory device 135 maintains the number of erased memory blocks therein at a maximum optimal number. Thus, the storage capacity of 135 can often be inadequate for storing hibernation data without first evicting data. Consequently, the hibernation data must either be written directly to data storage disk 110 or data may be evicted from flash memory device 125 to make room for the hibernation data. In either case, data might be written to data storage disk 110 at a time when a user is likely to be closing or otherwise stowing host 10 and/or transporting host 10. Because such activity generally produces shock, vibration, and other physical disturbances capable of damaging the moving parts of hybrid drive 100, storage of hibernation data in this manner is highly undesirable.

To avoid any scenario in which data is written to data storage disk 110 as part of storing hibernation data, a portion of flash memory device 135 can be set aside as erased blocks that are dedicated for storing the hibernation data. This portion of flash memory device 135 includes only erased memory blocks that are immediately available for storing data, and is sized to accommodate the maximum possible quantity of hibernation data that can be generated by host 10. However, because the memory blocks reserved only for hibernation data storage cannot be used for any other data, and because such a reserved portion can be a significant portion of the total capacity of flash memory device 135, such a configuration of flash memory device 135 is generally impractical. For example, hibernation data can be on the order of about 4 GBs in size, while the total storage capacity of a typical flash memory device 135 can be on the order of about 16 GBs. Thus, in this example, 25% of the storage capacity of flash memory device 135 remains erased and idle except when hibernation data is stored.

While it is highly desirable to store hibernation data in flash memory device 135 rather than on data storage disk 110, the use of a dedicated portion of flash memory device 135 only for hibernation data is not, since the hibernation data-dedicated portion of flash memory device 135 is inherently underutilized. Thus, in some embodiments, a portion of flash memory device 135 is allocated for storing hibernation data that does not require dedicated memory blocks that can only store hibernation data. In addition, the way in which storage is allocated for the hibernation data has minimal impact on the performance of hybrid drive 100. Specifically, the memory blocks allocated for storing hibernation data in flash memory device 135 include memory blocks that are currently erased as well as memory blocks containing data that can be discarded without being saved to data storage disk 110. The different types of memory blocks in flash memory device 135 that are allocated for storing hibernation data are described in greater detail below, in conjunction with FIG. 3.

Figure 3:
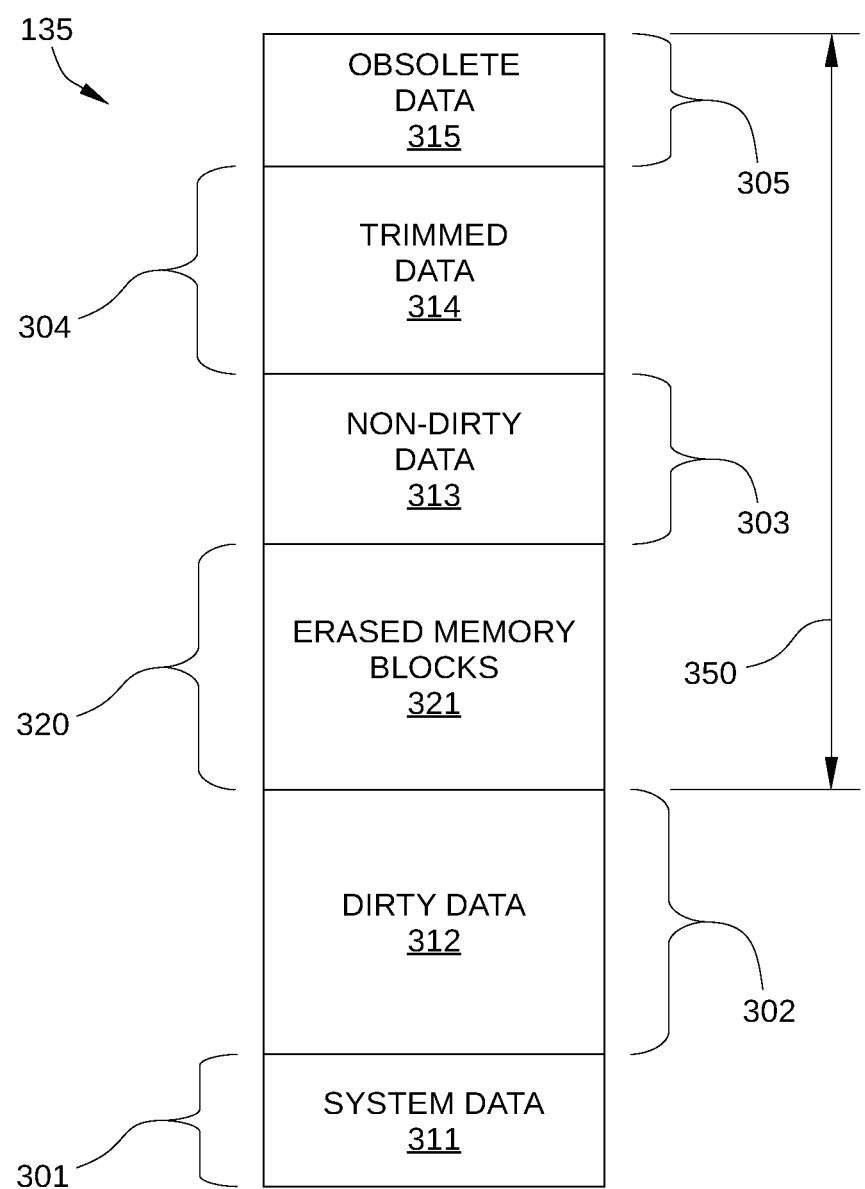
FIG. 3 is a schematic illustration of memory blocks included in a flash memory device and configured according to an embodiment of the invention.

FIG. 3 is a schematic illustration of memory blocks included in flash memory device 135 and configured according to an embodiment of the invention. As shown, the memory blocks of flash memory device 135 include data regions 301-305, each region respectively containing a different classification of data: system data 311, dirty data 312, non-dirty data 313, trimmed data 314, and obsolete data 315. In addition, flash memory device 135 includes erased data region 320, a region of flash memory device 135 comprised of erased memory blocks and storing no data. In the embodiment illustrated in FIG. 3, the data regions in flash memory device 135 that are allocated for storing hibernation data when requested by host 10 include data regions 303 304, and 305, and erased data region 320. In other words, in the embodiment illustrated in FIG. 3, hibernation data region 350 includes erased date region 320 and data regions 303, 304 and 305. In other embodiments, hibernation data region 350 includes erased data region 320 and at least one of data regions 303, 304, and 305.

While each of data regions 301-305 and erased data region 320 is depicted in FIG. 3 as an individual contiguous portion of flash memory device 135, it is understood that one or more of data regions 301-3045 and erased data region 320 can be fragmented, i.e., comprising multiple subregions distributed over non-adjacent portions of flash memory device 135. Thus, each of data regions 301-305 and erased data region 320 may be fragmented over a variety of separate memory blocks or regions in flash memory device 135, but each will be referred to respectively as a single entity. In some embodiments, each of data regions 301-305 may include portions of one or more memory blocks. Thus, such memory blocks will include a combination of system data 311, dirty data 312, non-dirty data 313, trimmed data 314, and/or obsolete data 315.

System data 311 includes data for facilitating operation of flash memory device 135 and/or hybrid drive 100, including file allocation tables, the translation layer, etc. As such, the portion of flash memory device 135 that includes system data 311, i.e., data region 301, is generally unavailable for storage of any portion of hibernation data for host 10.

Dirty data 312 includes data that has only been stored in flash memory device 135 in the interest of performance, and has not yet been saved to data storage disk 110. As noted previously, writing any portion of hibernation data to the portion of flash memory device 135 that includes dirty data 312, i.e., data region 302, would first involve flushing some or all of dirty data 312 to data storage device 110. Consequently, data region 302 is not included in the memory blocks available for storing hibernation data, according to embodiments of the invention.

Non-dirty data 313 includes data stored in flash memory device 135 that has a corresponding copy stored on data storage disk 110. Thus, some or all of the data region in which non-dirty data 313 is stored, i.e., data region 303, can be safely evicted and erased without loss of stored data. According to some embodiments, data region 303 is included in the memory blocks available for storing hibernation data. Consequently, when host 10 requests that hybrid drive 100 stores hibernation data, non-dirty data 313 can be erased and some or all of the hibernation data can be written to data region 303, thereby storing the hibernation data without writing any data to data storage disk 110.

Trimmed data 314 includes portions of any previously stored hibernation data for which host 10 has issued trim commands as well as any other data for which host 10 has issued trim commands. The hibernation data included in trimmed data 314 captures a previous state of host 10 and therefore will not be requested. Therefore, some or all of the data region in which trimmed data 314 is stored, i.e., data region 304, can be safely erased without loss of stored data. According to some embodiments, data region 304 is included in the memory blocks allocated for storing hibernation data. Consequently, when host 10 requests that hybrid drive 100 stores hibernation data, trimmed data 314 can be erased and some or all of the hibernation data can be written to data region 304, thereby storing the hibernation data without writing any data to data storage disk 110. In some embodiments, host 10 issues a TRIM command to hybrid drive 100 to indicate that a particular instance of hibernation data is obsolete and therefore should be included in trimmed data 314.

Obsolete data 315 includes data that are considered "invalid" by the host, i.e., data for which a newer copy has been written elsewhere in flash memory device 135 at some time after the now obsolete data was written.

Erased data region 320 includes only erased memory blocks that are available for immediately receiving write data, such as hibernation data. Erased data region 320 may include erased memory blocks 321, which have been erased as part of the normal operation of hybrid drive 100. For example, erased memory blocks 321 may include memory blocks that are erased to maintain a predetermined optimal portion of flash memory device 135 available for immediately receiving write data.

As noted above, non-dirty data 313, trimmed data 314, and/or obsolete data 315 may be fragmented and scattered among many memory blocks of flash memory device 135. Consequently, in some embodiments, portions of data region 303, 304, and/or 305 may include over-provisioned memory blocks. In a solid state drive (SSD) with only NAND-Flash, over-provisioned memory blocks are memory blocks that are part of the physical capacity of flash memory device 135, but are generally not presented to a host computing device as logical capacity. In hybrid drive 100, over-provisioned memory blocks serve a similar purpose. The over-provisioned capacity of flash memory device 135 is capacity that will not be used, so that the fraction of the storage capacity of flash memory device that contains user data will not exceed a specified level. If, for example, 10% of the storage capacity of flash memory device 135 is allocated for over-provisioning, then the fraction of flash memory device 135 that contains user data will never exceed 90%. In the worst case, those un-used memory sections will be evenly-distributed among all of the blocks in the flash memory. For example, in order for hybrid drive 100 to obtain 1 erase-block, it would need to use garbage collection to consolidate the contents of 10 blocks (90% of each block containing user-data, and 10% containing obsolete data) into 9 blocks, leaving one block that could be erased and re-used. The extra data storage space provided by over-provisioned memory blocks is useful during garbage collection, wear-leveling, and bad block mapping operations that take place during normal operation of flash memory device 135. According to embodiments of the invention, such over-provisioned memory blocks may be included in hibernation data region 350 since these over-provisioned memory blocks are known to be available when hibernation data is being written to flash memory device 135. This is because garbage collection, wear-leveling, and bad block mapping operations generally do not take place after hibernation data is written, because hybrid drive 100 (along with the host 10) is about to be powered off. After hybrid drive 100 and host 10 are powered back on and the hibernation data is read by host 10, host 10 should trim the hibernation-data, and the associated memory blocks can be erased and either re-used or made part of the over-provisioning capacity of flash memory device 135. The hibernation-data is generally a very large sequential set of data-sectors. Once that data is trimmed, it is relatively easy for the drive to recover the use of the associated flash blocks, because most if not all of the blocks contain only that trimmed data, and thus little or no garbage collection is required to recover them.

According to some embodiments of the invention, hybrid drive 100 allocates erased data region 320 and portions of data region 303, data region 304, and/or data region 305 as part of hibernation data region 350. Hibernation data region 350 is sized to have a storage capacity that accommodates the largest possible hibernation data that can be generated by host 10. When commands are received by hybrid drive 100 that can reduce the size of hibernation data region 350 below such a predetermined storage capacity, data received by hybrid drive 100 are written directly to data storage disk 110 in some embodiments. In alternative embodiments, when such commands are received by hybrid drive 100, one or more of data regions 303, 304 and 305, and erased data region 320 are increased in size accordingly before data are received by hybrid drive 100.

For example, in one embodiment the desired storage capacity of hibernation data region 350 is 4 GBs. At one moment during normal operation of hybrid drive 100, hibernation data region 350 includes erased data region 320 with a storage capacity of 3 GBs, data region 303 with a storage capacity of 1 GB, and data region 304 with a storage capacity of 1 GB. Thus, at this point in time hibernation data region 350 has a storage capacity of 5 GBs. As a series of write requests from host 10 are received by hybrid drive 100, data are written directly in erased data region 320. The portions of erased data region 320 that receive the newly written data are then, according to FIG. 3, considered a portion of data region 302 and newly written data is considered a portion of dirty data 312. Consequently, as data is written to hybrid drive 100, erased data region 320 decreases in size, and data region 302, which stores dirty data 312, increases in size. Hibernation data region 350 includes erased data region 320, and therefore hibernation data region 350 also decreases in size as memory blocks in erased data region 320 accept data and become memory blocks in dirty data region 304. If hybrid drive 100 continues to receive data and has insufficient idle time to flush dirty data to data storage disk 110, this process continues until erased data region 320 is reduced in size to 2 GBs. At this juncture, in this illustrative example, when erased data region 320 is reduced in size to 2 GBs and data regions 303 and 304 each have a storage capacity of 1 GB, the storage capacity of hibernation data region 350 is reduced to the 4 GB minimum desired storage capacity of hibernation data region 350. Hybrid drive 100 then actively manages the size of hibernation data region 350 by writing additional data received from host 10 directly to data storage disk 110. In this way, the minimum desired storage capacity of hibernation data region 350 is maintained, and hibernation data can be stored in flash memory device 135 whenever requested by host 10 and without the necessity of writing data to data storage disk 110. Alternatively, hybrid drive 100 may instead stop receiving data until hibernation data region 350 is increased in size by flushing portions of dirty data 312 to data storage disk 110.

In one embodiment, hybrid drive 100 can consider another factor during normal operation in determining whether new write data should be accepted to flash memory device 135, as opposed to sending the received write data directly to storage disk 100. To wit, hybrid drive 100 can consider the time required to perform the necessary garbage collection to maintain the size of hibernation data region 350 equal to or greater than the predetermined minimum size, i.e., large enough to store all hibernation data that may be generated by host 10. The process of garbage collection consists of copying all dirty data and valid data for which an identical copy also exists on storage disk 110 from the current block to another (erased) block. Because that copy-operation excludes invalid data being stored in the current block, the copied data generally fill less than one erased block. For example, if half of each of two blocks includes dirty data and/or valid data with an identical copy on storage disk 110, then those two blocks can be "garbage collected" (i.e., copied) into one erased block, thereby providing two blocks that can be erased and made available for use.

In considering garbage collection time when deciding whether new write data should be accepted to flash memory device 135, hybrid drive 100 may determine that garbage collection will take too long to increase the size of hibernation data region 350, and instead write data directly to storage disk 100. Specifically, if some of non-dirty data 313, trimmed data 314, and/or obsolete data 315 are spread among many erase-blocks, then a prohibitively long time may be required to consolidate those blocks and thereby produce erased blocks that can accept new hibernation data. For example, if 0.1% of the available capacity of flash memory device 135 is spread evenly among 10% of the blocks, so that 1% of each of the blocks contains non-dirty data 313, trimmed data 314, and/or obsolete data 315, then hybrid drive 100 would need to consolidate about 100 blocks to produce a single block that can accept new data. In such a situation, hybrid drive 100 may not consider those portions of data region 305 as available for storage of hibernation data. Thus, in some embodiments, hybrid drive 100 can use information about the state of fragmentation of non-dirty data 313, trimmed data 314, and/or obsolete data 315 to determine what blocks to include when determining the amount of flash memory device 135 that is available for storage of hibernation data and can be considered part of hibernation data region 350. Consequently, the amount of flash memory device 135 that is available for storage of hibernation data might be smaller than the total amount of non-dirty data 313, trimmed data 314, and/or obsolete data 315 in flash memory device 135. If, however, most or all of non-dirty data 313, trimmed data 314, and/or obsolete data 315 is in blocks for which a substantial portion of the capacity is one of these types of erasable data, then most or all of data regions 303 304, and 305 could be considered available for storage of hibernation data and part of hibernation data region 350.

Situations in which hybrid drive 100 receives enough data in a short enough interval to reduce the size of hibernation data region 350 to the minimum desired storage capacity are relatively rare. Thus, embodiments of the invention described herein typically have little or no impact on the performance of hybrid drive 100, but configure hybrid drive 100 in such a way that hibernation data can be stored in flash memory device without any data being written to data storage disk 110.

It is noted that whenever hybrid drive 100 has sufficient idle time, some or all of dirty data 312 can be flushed to data storage disk 110, so that dirty data 312 is converted to non-dirty data, and data region 303 is increased in size. Thus, during normal operation, hybrid drive 100 generally takes measures to increase the storage capacity of hibernation data region 350, even when hibernation data region 350 already has more than the minimum desired storage capacity.

In writing hibernation data to one or more portions of hibernation data region 350 in flash memory device 135, hybrid drive 100 violates the policy in which hibernation data region 350 is maintained with a storage capacity at least as great as a predetermined minimum size. Consequently, in some embodiments, hybrid drive 100 determines or is notified that data being transmitted thereto for storage is hibernation data. In this way, hybrid drive 100 can write the hibernation data to and substantially fill hibernation data region 350.

In some embodiments, hybrid drive 100 receives notification from host 10 that the following write commands include hibernation data, and therefore writes the hibernation data to hibernation data region 350. In other embodiments, host 10 is configured to store hibernation data in a predetermined range of logical block addresses (LBAs). In such embodiments, hybrid drive 100 can recognize whether received data includes hibernation data based on the LBA range of the received data, and therefore write the hibernation data in hibernation data region 350. In yet other embodiments, hybrid drive 100 can independently determine whether data received from host 10 includes hibernation data without directly interacting with host 10 or coordinating a predetermined LBA range with host 10. For example, hybrid drive can be configured with an algorithm for detecting a partition table associated with host 10 that is stored on data storage disk 110 or flash memory device 135. Hybrid drive can then examine the partition table and file system to determine the LBA range used for hibernation data generated by host 10. In another example, the algorithm can detect specific files known in the art to be hibernation data, such as the file named "hiberfil.sys," so that whenever such a file is written to hybrid disk 100, the file is written to hibernation data region 350. In still another example, the algorithm can determine hibernation data is being received by observing interactions with host 10 immediately before powering down and immediately after powering up. Specifically, a file may be assumed to be hibernation data based on the size of the file; the fact that host 10 powers off shortly after writing the file; the fact that host 10 reads the file shortly after powering up; a TRIM command is issued by host 10 shortly after powering up and reading the file; if an unusually large number of inputs and outputs are exchanged between host 10 and hybrid drive 100 prior to receiving the file, etc.

In some embodiments, the hibernation data can be written in hibernation data region 350 in a mode that allows multiple bits of information to be stored in each memory cell. For example, the memory cells in hibernation data region 350 can store the hibernation data as multi-level cells, which are capable of storing more than a single bit of information. The write time to multi-level cells is significantly longer than to single-level cells, but since the writing of the hibernation data takes place when host 10 is powering down and is no longer in active use, such latency does not adversely affect the actual performance of the system. Furthermore, data retention of multi-level cells is known to be less than that of single-level cells. However, because hibernation data is, by definition, substantially the last file received from host 10 before powering down and essentially the first file read by host 10 after powering up, longevity of the hibernation data is less of a practical issue.

Figure 4:
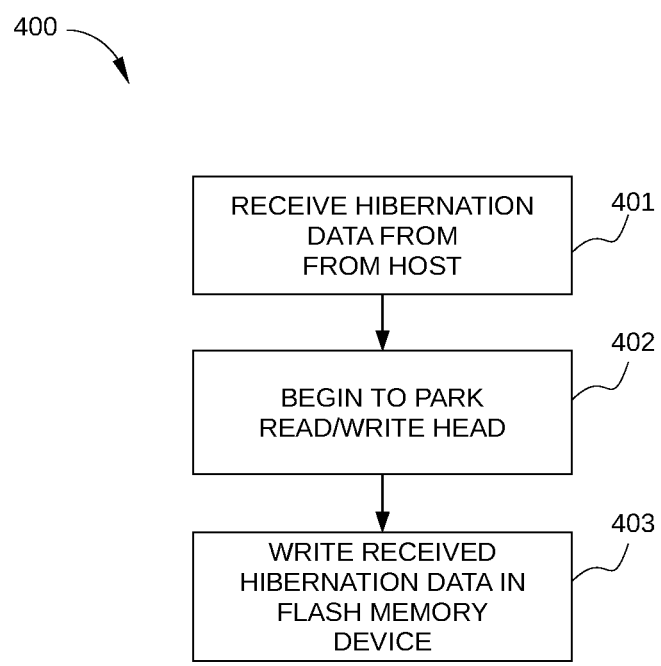
FIG. 4 sets forth a flowchart of method steps for storing data in a hybrid drive, according to embodiments of the invention.

FIG. 4 sets forth a flowchart of method steps for storing data in a hybrid drive, according to embodiments of the invention. Although the method steps are described in conjunction with hybrid drive 100 in FIGS. 1 and 2, persons skilled in the art will understand that method 400 may be performed with other types of systems. In some embodiments, prior to method 400, hybrid drive 100 has determined how to identify hibernation data being received from host 10, either based on a certain LBA range associated with previously saved hibernation data, information provided by host 10, such as a command indicating that the next file to be saved is hibernation data, or by observing interactions between host 10 and hybrid drive 100. Furthermore, prior to method 400, hybrid drive 100 has allocated sufficient storage capacity in flash memory device 135 to store hibernation data from host 10. The control algorithms for method 400 may reside in controller 133, flash manager device 136, or in host 10.

As shown, method 400 begins at step 401, when hybrid drive 100 receives hibernation data from host 10 to be stored. As noted above, hybrid drive 100 has determined that the data received in step 401 includes hibernation data, and responds accordingly in the following steps.

In step 402, hybrid drive 100 begins to park read/write head 127 and to spin down spindle motor 114 so that the potential for damage to the moving parts of hybrid drive 100 is minimized.

In step 403, hybrid drive 100 writes the data received in step 401 to hibernation data region 350. Step 403 may take place concurrently with step 402, i.e., while read/write head 127 is being parked and spindle motor 114 is being spun down. As noted above, hibernation data region 350 includes erased data region 320 and at least one of data region 303 and data region 304. Because hibernation data region 350 includes at least one of data regions 303, 304 and/or 305, which are not erased memory blocks, the data contained therein is first erased prior to writing the data received in step 401 into data region 303 and/or data region 304. Because data region 303 only contains non-dirty data 313, data region 304 only contains trimmed data 314, and data region 305 only contains obsolete data 315, the contents of each of these data regions can be erased without being flushed to storage disk 110.

Figure 5:
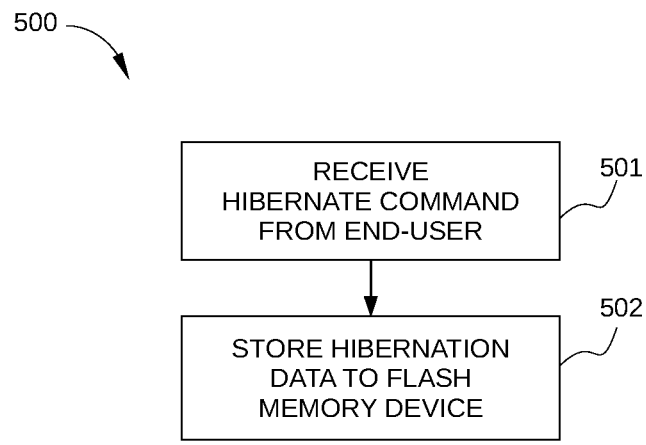
FIG. 5 sets forth a flowchart of method steps for hibernating a computing device that has a volatile memory and is connected to a nonvolatile storage unit, such as a hybrid drive, according to embodiments of the invention.

FIG. 5 sets forth a flowchart of method steps for hibernating a computing device that has a volatile memory and is connected to a nonvolatile storage unit, such as hybrid drive 100, according to embodiments of the invention. Although the method steps are described in conjunction with hybrid drive 100 in FIGS. 1 and 2, persons skilled in the art will understand that method 500 may be performed with other types of systems. In some embodiments, prior to method 500, hybrid drive 100 has allocated sufficient storage capacity in flash memory device 135 to store hibernation data from host 10. The control algorithms for method 500 may reside in controller 133, flash manager device 136, or in host 10.

As shown, method 500 begins at step 501, when a computing device receives a hibernate command, for example from an end-user of the computing device. The computing device may be any technically feasible computing device that has a volatile memory, such as DRAM, and is connected to a hybrid drive, which includes a solid-state memory and a magnetic memory. Suitable computing devices include a desktop computer, a laptop computer, a smart phone, a personal digital assistant (PDA), tablet computer, or any other type of computing device configured to store and process data.

In step 502, upon receiving the hibernate command in step 501, the computing device stores contents of the volatile memory in first and second portions of the solid-state memory without storing contents of the volatile memory in the magnetic memory, where the first portion comprises erased memory blocks and the second portion comprises memory blocks storing data that are either stored on the magnetic drive, old hibernation data, and/or obsolete data. In other words, the computing device stores hibernation data in hibernation data region 350 of flash memory device 135.

Figure 6:
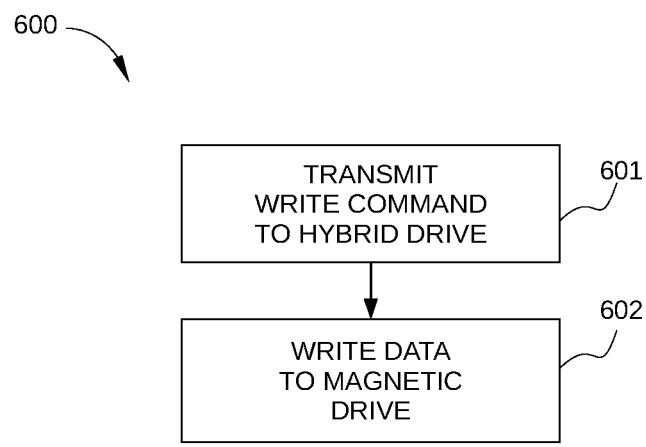
FIG. 6 sets forth a flowchart of method steps for storing data in a computing device that has a volatile memory and is connected to a nonvolatile storage unit, such as a hybrid drive, according to embodiments of the invention.

FIG. 6 sets forth a flowchart of method steps for storing data in a computing device that has a volatile memory and is connected to a nonvolatile storage unit, such as hybrid drive 100, according to embodiments of the invention. Although the method steps are described in conjunction with hybrid drive 100 in FIGS. 1 and 2, persons skilled in the art will understand that method 600 may be performed with other types of systems. The control algorithms for method 600 may reside in controller 133, flash manager device 136, or in host 10, and the computing device may be any technically feasible computing device as described above in conjunction with method 500.

As shown, method 600 begins at step 601, when the computing device transmits a write command to the nonvolatile storage unit during normal operation of the computing device.

In step 602, when a combined data storage capacity of an allocated storage space in the flash memory device 135, i.e., hibernation data region 350, is less than a predetermined threshold, the computing device writes data to data storage disk 110. In other words, when hibernation data region 350 is at a minimum allowable size for storing hibernation data, the computing device stores data in data storage disk 110, so that hibernation data region 350 is maintained to be equal to or greater than said minimum allowable size. In this way, hibernation data region 350 can be used to immediately store hibernation data without any data being flushed to data storage disk 110.

In sum, embodiments of the invention provide systems and methods for storing hibernation data in a flash memory device of a hybrid drive. By allocating hibernation data region in the flash memory device that has sufficient storage capacity for hibernation data, the hybrid drive can store hibernation data at any time without also storing data to the storage disk portion of the hybrid drive. Advantageously, embodiments of the invention allow hibernation data to be saved concurrently with shutting down the disk drive portion of the hybrid drive, thereby protecting the disk drive portion from physical disturbances.

While the foregoing is directed to embodiments of the present invention, other and further embodiments of the invention may be devised without departing from the basic scope thereof, and the scope thereof is determined by the claims that follow.

We claim:

1. A method of hibernating a computer system running in a host in a device having a first nonvolatile memory and a second nonvolatile memory comprising a plurality of memory blocks, the method comprising:
   receiving from the host a hibernate command and a hibernation file associated with the computer system running in the host; and
   upon receiving the hibernate command, erasing non-dirty data stored in a portion of the second nonvolatile memory, the portion excluding memory blocks storing dirty data, which represents valid data stored in the second nonvolatile memory but not in the first nonvolatile memory, and storing the hibernation file into the portion of the second nonvolatile memory,
   wherein the non-dirty data represents valid data stored in both the first nonvolatile memory and the second nonvolatile memory, and copies of the non-dirty data and the dirty data are preserved during a garbage collection process.

2. The method of claim 1, wherein the first nonvolatile memory comprises a magnetic memory, the method further comprising:
   prior to storing the hibernation file into the portion of the second nonvolatile memory, initiating parking of a magnetic head in the magnetic memory.

3. The method of claim 1, further comprising:
   prior to receiving the hibernate command, maintaining a data storage capacity of the portion to be sufficient to store an expected size of the hibernation file.

4. The method of claim 3, further comprising:
   in response to a write command, when the data storage capacity of the portion is less than a predetermined threshold, storing data of the write command into the first nonvolatile memory and not into the second nonvolatile memory.

5. The method of claim 4, wherein the predetermined threshold is no greater than the data storage capacity of the second nonvolatile memory.

6. The method of claim 1, further comprising:
   prior to storing the hibernation file, trimming the contents of the previous hibernation file.

7. The method of claim 1, further comprising:
   prior to storing the hibernation file, performing a garbage collection.

8. The method of claim 1, wherein the portion is fragmented and comprises at least two subportions that are non-adjacent in a logical address space of the second nonvolatile memory.

9. The method of claim 1, wherein, at the time the hibernate command is received, the portion further comprises erased memory blocks.

10. A storage system comprising:
    a first nonvolatile memory;
    a second nonvolatile memory comprising a plurality of memory blocks; and
    a storage controller configured to receive a hibernate command from a host and a hibernation file associated with the host, wherein
    the storage controller erases non-dirty data stored in a portion of the second nonvolatile memory, the portion excluding memory blocks storing dirty data, which represents valid data stored in the second nonvolatile memory but not in the first nonvolatile memory, and
    upon receiving the hibernate command, the storage controller stores the hibernation file into the portion of the second nonvolatile memory,
    wherein the non-dirty data represents valid data stored in both the first nonvolatile memory and the second nonvolatile memory, and copies of the non-dirty data and the dirty data are preserved during a garbage collection process.

11. The storage system of claim 10, wherein the first nonvolatile memory comprises a magnetic memory, and the storage controller, prior to storing the hibernation file into the portion of the second nonvolatile memory, initiates parking of a magnetic head in the magnetic memory.

12. The storage system of claim 10, wherein the storage controller, prior to receiving the hibernate command, maintains a data storage capacity of the portion to be sufficient to store an expected size of the hibernation file.

13. The storage system of claim 12, wherein the storage controller, in response to a write command, when the data storage capacity of the portion is less than a predetermined threshold, stores data of the write command into the first nonvolatile memory and not into the second nonvolatile memory.

14. The storage system of claim 13, wherein the predetermined threshold is no greater than the data storage capacity of the second nonvolatile memory.

15. The storage system of claim 10, wherein the storage controller, prior to storing the hibernation file, trims the contents of the previous hibernation file.

16. The storage system of claim 10, wherein the storage controller, prior to storing the hibernation file, performs a garbage collection.

17. The storage system of claim 10, wherein the portion is fragmented and comprises at least two subportions that are non-adjacent in a logical address space of the second nonvolatile memory.

18. The storage system of claim 10, wherein, at the time the hibernate command is received, the portion further comprises erased memory blocks.

* * * * *